May 11, 1937.  L. A. SHARP  2,079,636
DISTRIBUTION OF ELECTRICITY
Filed Sept. 9, 1933   3 Sheets-Sheet 1

L. Alan Sharp
INVENTOR

BY Cooper, Kerr & Dunham
ATTORNEYS

May 11, 1937.  L. A. SHARP  2,079,636
DISTRIBUTION OF ELECTRICITY
Filed Sept. 9, 1933  3 Sheets-Sheet 2

L. Alan Sharp
INVENTOR

BY Cooper, Kerr & Dunham
ATTORNEYS

May 11, 1937.    L. A. SHARP    2,079,636
DISTRIBUTION OF ELECTRICITY

Filed Sept. 9, 1933    3 Sheets-Sheet 3

2.4 MILLIAMPERES

60 CYCLE A.C.

15 MILLIAMPERES

60 CYCLE A.C.

15 MILLIAMPERES

60 CYCLE A.C.

L. Alan Sharp
INVENTOR

BY Cooper, Kerr & Dunham
ATTORNEYS

Patented May 11, 1937

2,079,636

UNITED STATES PATENT OFFICE 2,079,636

DISTRIBUTION OF ELECTRICITY

L. Alan Sharp, Bellevue, Pa.

Application September 9, 1933, Serial No. 688,822

5 Claims. (Cl. 175—294)

The present invention relates to a novel method and system of electrical distribution and to a novel supervisory control apparatus adapted for use in electrical distribution systems adapted to the general end of removing shock, life and fire hazards from desired portions of such systems.

Present methods of protection in electrical distribution systems include the provision of overload protective devices such as fuses and circuit breakers and the provision of protective ground connections. The overload devices serve to protect the circuit wires from overloads and short circuits, but do not afford any protection against shock and life hazards and afford only little protection against fire hazards, current leakage and wastage. The ground protective connections are intended to localize the high potential upon a particular conductor or conductors with respect to all other current carrying mediums which are intended to be maintained so far as possible at a common potential. Ground protection in turn is dependent upon the overload devices for the removing of potential from parts of the system and therefore likewise does not remove shock and life hazards and leaves a considerable fire hazard and furthermore increases the possibility of current leakage and wastage. With present protective grounding systems a leakage possibly small must develop into an overload before protection by disconnection takes place. Ground protection is furthermore dependent upon an adequate ground which is often difficult and sometimes impossible to obtain.

With present grounding practices the shock and life hazards and current leakage and waste and other disadvantages still remain, due to the high potential difference between current carrying parts and the common ground. Some efforts have been made to improve grounding protection by providing devices for interrupting circuits of portions of the distributing system when a difference of potential existed between the ground proper and parts which were intended to be grounded, but which in fact were not properly grounded. Such devices, however, do not remove the hazards attendant upon the establishments of accidental grounds or leakage paths from current carrying parts or conductors. Such devices furthermore do not minimize or eliminate the numerous inherent disadvantages of so-called protective grounding.

The present invention has for its general object the provision of a new method and means of electrical distribution and the provision of a supervisory control apparatus adapted for use in such systems which will eliminate and minimize the defects of previous systems.

A further object of the present invention resides in the provision of a method and means for eliminating shock, life and fire hazards attendant upon the establishment of an unintentional ground or leakage path to ground from current carrying parts or conductors.

A further object of the present invention resides in the provision of a method and means for eliminating or minimizing current leakage and waste in the distribution of electricity.

A further object of the present invention resides in the provision of means to eliminate the need of a low resistance ground in electrical distribution systems or portions thereof.

A further object of the present invention resides in the provision of a system which will at least discourage, if not prevent the use of unsafe wiring materials and appliances.

A further object of the present invention resides in the provision of a system and means whereby faults and break-downs will be immediately detected.

A further object of the present invention resides in the provision of means for protecting an electrical distribution system or portions thereof against effects of certain surges.

A further object of the present invention resides in the provision of a system which will eliminate the effects of stray currents upon water piping, building steel, telephone parts and the like.

A further object of the present invention resides in the provision of a system and apparatus for improving protection in the distribution of electricity which is adaptable to existing wiring systems, installations and methods of wiring as practiced at the present time.

A further object of the present invention resides in the provision of a protective electric system and in the provision of apparatus therefor which will isolate the load lines from the ground and which will also effect disconnection of the load lines from the supply lines in the event that the isolation conditions upon the load lines are not maintained.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

Figure 1:
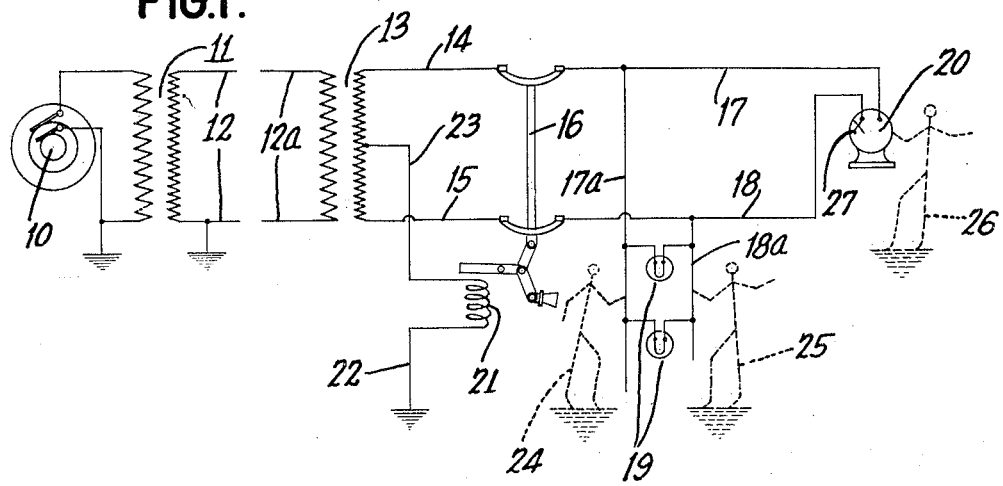
Figure 1 shows somewhat diagrammatically a simple embodiment of the improved safety supervisory control apparatus and an electrical distribution system in which this apparatus is incorporated.

Referring first to Fig. 1, 10 represents an A. C. generator which supplies current through a transformer 11 to supply lines 12.

As shown, one side of the generator 10 is grounded and one of the supply lines is shown as grounded. This is the usual practice. Lines 12a are continuations of the supply lines 12 and are shown broken off from 12 to indicate that an additional transformer or transformers may be disposed intermediate the generator 10 and the supply lines 12a. The supply lines 12a are adapted for connection to the primary coil of a transformer 13 which forms a part of the supervisory control apparatus.

The secondary coil of the transformer 13 is connected to conductors 14 and 15 of the protective apparatus, which, through a circuit breaker generally designated 16, extend to points of connection with the load lines 17 and 18. Various electrical loads may be connected to the load lines 17 and 18. As shown, a lamp load is indicated generally at 19 receiving current from branch load lines 17a and 18a and a motor 20 is shown receiving current directly from the lines 17 and 18. The circuit breaker 16 is normally in closed position as shown and this circuit breaker is adapted to be displaced to circuit breaking or open position by means of a tripping coil 21. One end of the tripping coil connects to a conductor 22 which extends to ground as shown. The opposite end of the tripping coil is connected by a conductor 23 to a center tap of the secondary of the transformer 13.

It will be understood that the transformer 13 is of such type that while affording current supply to the load lines 17 and 18, it effectively insulates and isolates both of these load lines from any characteristic ground including that of the primary supply circuits or that of the generator 10.

The manner in which the apparatus affords protection may be best understood upon assuming that certain accidental grounds or leakage paths to ground are established. These accidental grounds are indicated by dotted lines. Assume first that a person, as indicated at 24, touches load line 17 or 17a as shown. A circuit will thereupon be established traced as follows: From the secondary of the transformer 13, via wire 14, through the circuit breaker, via load lines 17, 17a, through the person 24, via the ground, indicated by dotted lines, back to the full line ground which is connected to the ground circuit 22 of the tripping coil 21, through the tripping coil 21 and back to the secondary of the transformer through conductor 23. The tripping coil 21 will thereupon be energized and such energization of the tripping coil will trip the circuit breaker 16 and disconnect the load lines 17 and 18 from the transformer.

A similar ground will be established if a person, as indicated at 25, establishes an inadvertent ground circuit by touching load line 18 or 18a as indicated. A similar tripping circuit will be completed if a person, as indicated at 26, touches the frame of the motor 20, the motor having a defective ground as indicated by the cross 27. The last mentioned ground, it will be understood, will be established, provided frame 20 is insulated from ground. If, on the other hand, the frame of the motor 20 is grounded, the tripping circuit will be established upon the defective ground 27 being established in the motor.

In practice, the tripping coil 20 should be of such proportions and so arranged as to trip with a very minute flow of current and the coil should be of such proportions that the current flow required to operate the circuit breaker will not be such as to produce an injury to an individual establishing an accidental ground. The coil therefore should be a sensitive coil.

Figure 2:
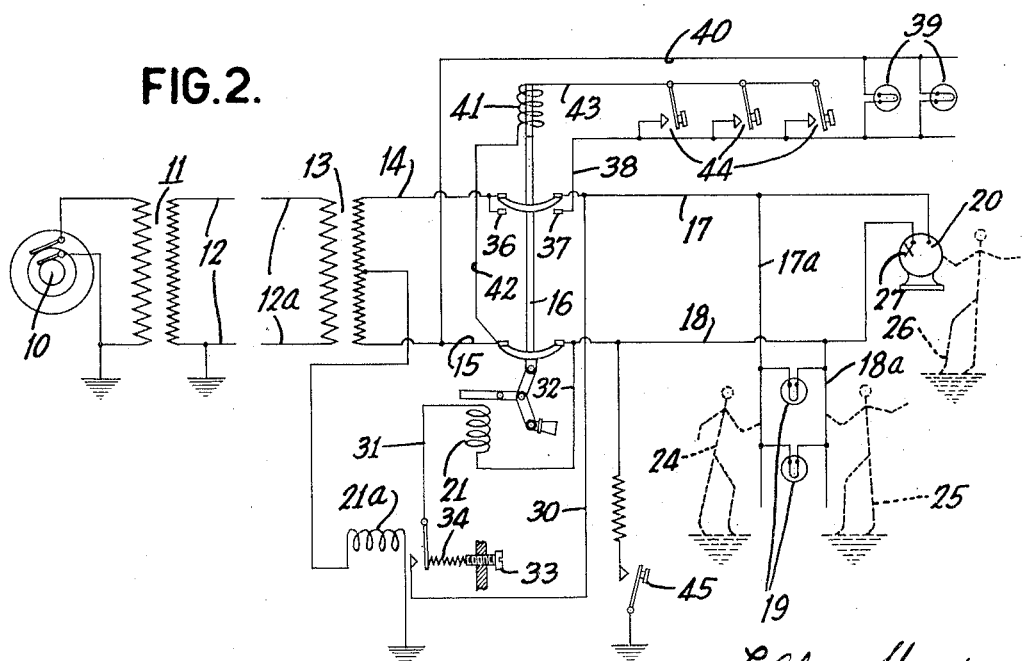
Fig. 2 shows another and preferred embodiment of the invention for alternating current distribution systems and in this embodiment certain supplemental features are incorporated in addition to those shown in the embodiment illustrated in Fig. 1.

Preferably, in order that the current flow in the tripping circuit may be kept low and to provide sufficient energy to readily operate the circuit breaker, the circuit arrangement of Fig. 2 is employed. In this figure similar reference characters will be given to similar parts.

In this embodiment, in place of providing the tripping coil intermediate conductors 22 and 23, a relay coil 21a is provided. This is a relay of sensitive type. Upon energization of this coil 21a, the armature of the relay is attracted and a tripping circuit is established traced as follows: From load line 17 upon the load side of the circuit breaker 16, via conductor 30, through the attracted armature of the sensitive relay, through wire 31, to the tripping coil 21 of the circuit breaker 16 and back via conductor 32 to the load line 18 upon the load side of the circuit breaker 16. The energization of the relay coil 21a will be brought about in the same manner as previously described, viz. by the establishment of an accidental ground or of a leakage path to ground. Energization of the sensitive relay coil 21a will complete the tripping circuit to the tripping coil 21 and trip the circuit breaker 16 to cut off further supply of current to the load lines 17 and 18. The tripping of the circuit breaker will also de-energize relay coil 21a and tripping coil 21.

In practice, it may be desirable to provide an adjustment for the sensitivity of the relay. Such adjustment may be secured by means of an adjusting screw 33 for adjusting the tension of spring 34, which is connected to the armature of the relay.

The sensitivity of the relay may further be in-

Figure 2A:
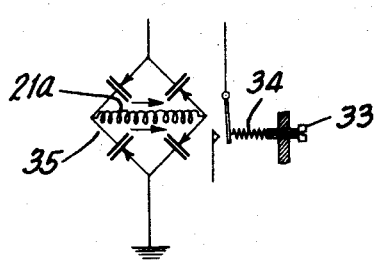
Fig. 2A shows a modification of one of the devices shown in Fig. 2 incorporating rectifying means for the relay for the tripping circuit to provide for D. C. operation of the relay.

The sensitivity of the relay may further be increased by providing means for supplying direct current to the relay coil 21a. This may be done by providing a suitable full wave rectifier, preferably one of the copper oxide type as indicated at 35 in Fig. 2A.

It may be desirable to provide current supply to one or more emergency lights upon the tripping of the circuit breaker 16 when normal lights and load are cut off. This may be accomplished by providing supplementary contacts 36 and 37 on the circuit breaker, which contacts become closed upon the tripping of the circuit breaker 16 to the position which interrupts current supply to the load lines 17 and 18. From contact 37 a circuit 38 leads to one side of the emergency light or lights 39 and the return path is via wire 40 to line 15, which is on the supply side of the circuit breaker 16. After the circuit breaker 16 has tripped to opened position, it may be desirable to provide remote controlled resetting means for the circuit breaker. This may be provided for in the following manner. A resetting coil or solenoid 41 is provided, which upon being energized, is adapted to reset the circuit breaker. The circuit for this resetting coil is as follows: From line 15 on the supply side of the circuit breaker 16 a wire 42 leads to one end of the coil 41. From coil 41 a circuit 43 leads to one or more normally open momentary contact switches 44. The return path is via wire 38 to contact 37. It will be understood that upon restoration of the circuit breaker to its normal closed position, the reset circuit and the emergency light circuit will be interrupted.

It may be desirable to provide for the testing of the system to check the operation of the relay and the tripping coil of the circuit breaker. Testing may be effected by means of a test key or test switch 45 disposed between ground and one of the load wires such as 18. A resistance may or may not be provided in the line leading to the test switch 45.

According to the embodiment of the invention shown in both Figs. 1 and 2, the potential across the tripping coil 21 in Fig. 1 and across the relay coil 21a in Fig. 2, is only one-half the potential across lines 14 and 15 or load lines 17 and 18. This in itself provides for safety. It will be understood that the one-half potential is provided by reason of the conductor 23 extending to the center tap of the secondary of the transformer.

The protective action of the apparatus shown in Fig. 2 under accidental grounds need not be here repeated since the circuit paths of the accidental grounds cause energization of the relay coil 21a with attendant energization of the tripping coil 21 similarly as described for the Fig. 1 embodiment.

It will be further understood that the device functions to isolate or disconnect the load lines upon any inadvertent ground being established. Such grounds need not be necessarily established through a human agency but may be established upon the breaking down of the insulation upon any live part of the load portion of the system.

Figure 2B:
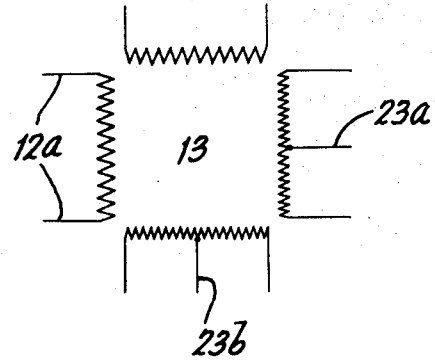
Fig. 2B shows a modified and alternate arrangement of transformer which may be used in certain systems where multiple service is desired from a common transformer.

In certain cases, in lieu of using a transformer such as 13 having a single secondary, it may be desirable to provide multiple secondary windings on the transformer. Such an arrangement is shown in Fig. 2B wherein three secondary coils are provided cooperating with a single primary. Two of the secondary coils are shown with center taps for connection to wires 23 and 23a as shown for supervisory control purposes. The third secondary is shown without a center tap and such secondary may be used on systems where protection is not desired and where continuity of service is more important, for example, such secondary may be used for supply service to clock systems and the like.

Figure 3:
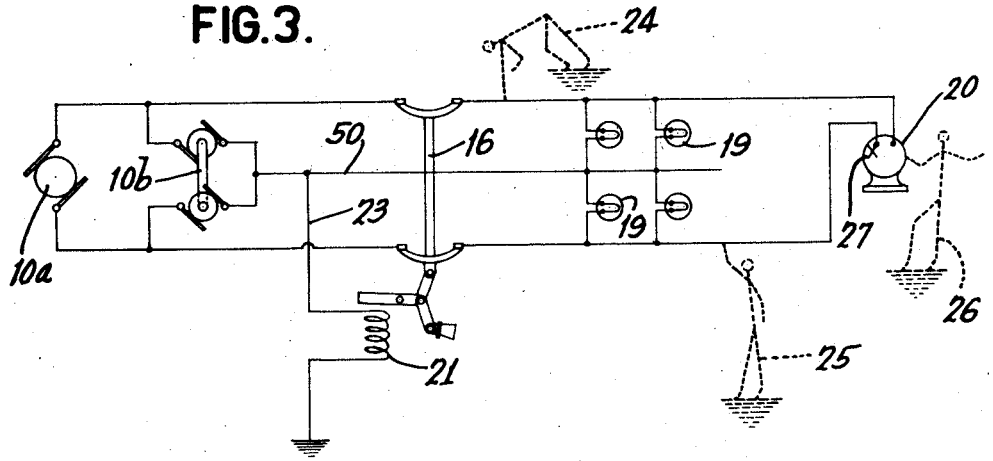
Fig. 3 shows the improved supervisory control in simple form applied to a direct current distribution system.

Fig. 3 shows an embodiment of the invention in a D. C. system. Here D. C. supply to the supply main and to the neutral of the system is afforded by D. C. generator 10a cooperating with a motor generator or balancer set 10b. The circuit breaker 16 has its tripping coil 21 connected to ground and through wire 23 to the neutral wire 50. 19 indicates a lamp load, 20 a motor load and 24, 25 and 26 are symbols representing a personally established ground. The operation is substantially the same as described for the system of Fig. 1.

Figure 3A:
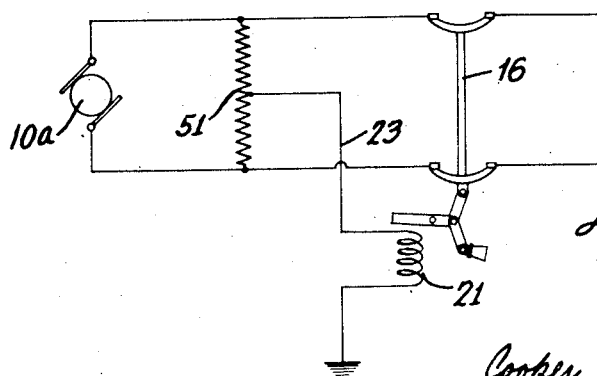
Fig. 3A shows a modified form of supervisory control for a D. C. distributing system.

Fig. 3A shows another D. C. protective system embodying a resistance 51 across the supply main with the trip coil 21 for the circuit breaker 16 receiving current through conductor 23 which connects to substantially the mid-point of the resistance 51 so as to provide a voltage across the trip coil upon the establishment of an accidental ground which is relatively lower than the voltage across the load line or main.

Figure 4:
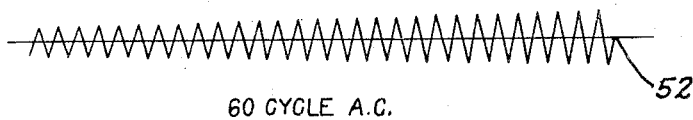
Figs. 4, 5 and 6 are oscillograms showing the action of the system in interrupting current flow under various operating conditions.

Referring now to the oscillogram shown in Fig. 4, this shows the time and current characteristics of the apparatus in operation in opening a circuit upon a slowly increasing leakage or touch contact. The A. C. alternations are shown as gradually progressing in amplitude of current intensity. The protection circuit finally receives current of sufficient strength to effect the tripping of the circuit breaker. Final tripping of the circuit breaker is indicated at point 52. The amount of current required to open the circuit breaker may be predetermined by the adjustment 33 shown in Fig. 2 and such amount of current may be well below an amount which is perceptible or dangerous. The time is indicated on the oscillograph by the number of wave alternations shown. This particular oscillograph shows a 60 cycle current which represents 60 cycles per second. With the accidental leakage path established gradually the amplitude of current is small at first but gradually and progressively builds up to the tripping point. With small amplitude of current irrespective of a rather extended time duration, there is no danger factor and current flow is broken off before current amplitude reaches a dangerous point.

The supervisory control apparatus further provides for tripping open the circuit upon the current amplitude reaching a measurable amount which would affect a meter or other measuring device.

Figure 5:
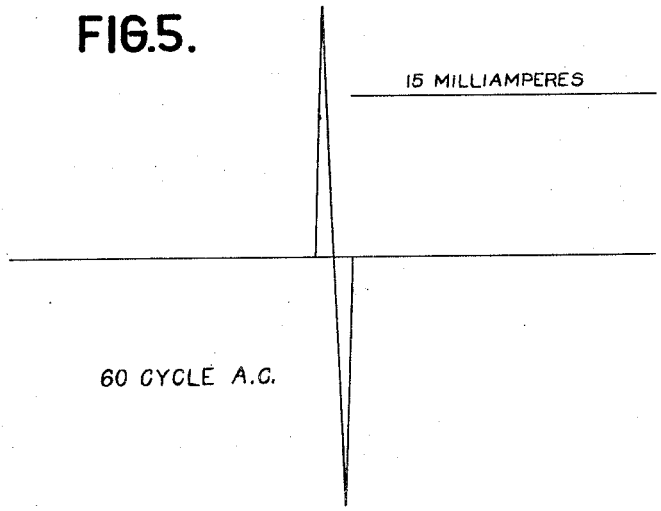
Figure 6:
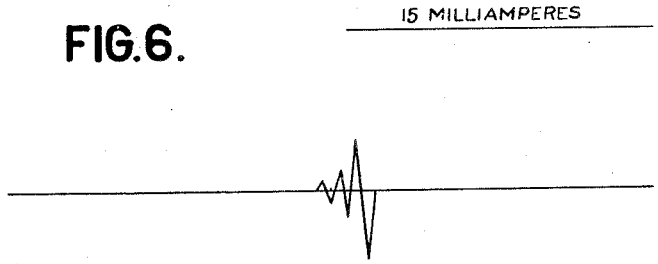

Fig. 5 shows another oscillogram showing the speed of operation of the device in opening the load circuits when a current leakage path of low resistance is instantaneously established. In this diagram interruption is completed in the period of one cycle, which indicates the speed of the isolating operation.

According to the present invention, protection is afforded at the incipience of a difficulty and the current which would have resulted in damage to life or property has in itself effected the requisite protection. This is effectively accomplished by removing the energy from that portion of a distribution system which is to be protected. The initial insulation and isolation of the load conductors from the ground as shown in Figs. 1 and 2 is also advantageous in that it provides an insulated distribution system or portion of such system. Such characteristics may also be provided in a D. C. system by the provision of a motor generator set in lieu of the transformer of Figs. 1 and 2. It may be desirable under certain conditions and on systems of certain voltages to extend the neutral conductor paralleling the load conductor, but such neutral conductor does not present a fire or casualty hazard, because its potential is reduced to the potential of the ground and contact will present no danger. If under some condition the neutral differs from earth potential and if a current can flow through a leakage path, such current will return through the tripping mechanism and still effect protection. With the system of the present invention any touching of a load conductor at potential above ground with the establishment of a circuit to ground will bring about protective disconnection.

In practice the supervisory apparatus may be made as a unit in a suitable control box with leads extending therefrom or binding screw terminals therein, or thereupon for affording the necessary connections to the supply and load lines of the distribution system and the connection to ground. Such a unit may be readily installed in an existing wiring system or in any new wiring which is being installed according to present wiring practice.

I employ, as stated, a sensitive relay. While other forms of sensitive relays may be employed, I have found to be satisfactory a relay of the telephone type, which has marked thereon the following United States patents: 1,121,897; 1,156,671; 1,586,884; 1,620,878; 1,633,576 and 1,652,489.

What I claim is:

1. An electrical distribution system comprising electrical supply wires and consumption circuit wires supplying energy to lamps, motors and the like, means for automatically de-energizing said consumption circuit wires when any of said consumption circuit wires is grounded through a person's body, the said de-energizing means including means for isolating the supply wires from the consumption circuit wires, and a continuous metallic conducting path to the ground through a circuit controlling translating device from the consumption circuit side of said isolating means and at a potential different from that of any of said consumption circuit wires.

2. The combination with an electrical distribution system comprising a plurality of electric supply line wires and a plurality of consumption circuit wires supplying energy to lamps, motors and the like, of means for isolating the physical circuit of the supply line wires from the distribution and consumption circuit wires, means for automatically de-energizing said consumption circuit wires when any of said wires is grounded through a person's body, said de-energizing means including a continuous metallic conducting path from the consumption circuit of said system and at a potential different from that of any of said consumption circuit wires through a relay to the ground, and a circuit controlling device in the consumption circuit actuated by said relay.

3. The combination with a current consumption wiring system, of a person-protecting apparatus for attachment between said current consumption wiring system and the source of supply for protection against injurious electric shocks, said apparatus comprising an isolating transformer having a primary winding for receiving energy from the source of supply and a secondary winding for transmitting energy to the consumption wiring system, translating means including an electromagnetic relay in continuous wired circuit relation between an intermediate tap on said secondary winding and ground and responsive to a circuit from said system to the ground, and an electromagnetic circuit breaker actuated by said relay for interrupting the supply of electrical energy to the consumption system upon passage from said system through a person to the ground of current of non-injurious magnitude and duration.

4. A protective system for electrical distribution systems and portions thereof for affording protection against shock and life hazards, comprising an isolating transformer with primary winding and a secondary winding to isolate the supply lines from the consumption circuits, a normally closed circuit opening device, electrically operated tripping means for said device and a normally incomplete series metallic conducting circuit from a protected portion of the distribution system through a portion of the secondary winding of the transformer, thence through the tripping means and to ground and adapted to be completed by a leakage path afforded by the human body whereby the circuit opening device is operated and power removed from the protected portion of the distribution system.

5. An electrical distribution system including an isolating transformer with a primary winding connected to the supply mains of the distributing system and with a secondary winding connected to the extended portion of the distribution system from which load is to be supplied and which portion is to be protected, a circuit breaker in the secondary circuit normally in closed circuit relation, a trip coil for said circuit breaker, a continuous wired circuit connection from the transformer secondary tapped thereto at an intermediate point for establishing a potential with respect to wires at the secondary circuit, thence to said trip coil and thence to ground, said circuit being adapted for completion, and said trip coil energized by the establishment of an accidental circuit from the secondary circuit to ground, whereby the secondary circuit is opened by the circuit breaker.

L. ALAN SHARP.